Figure 1:
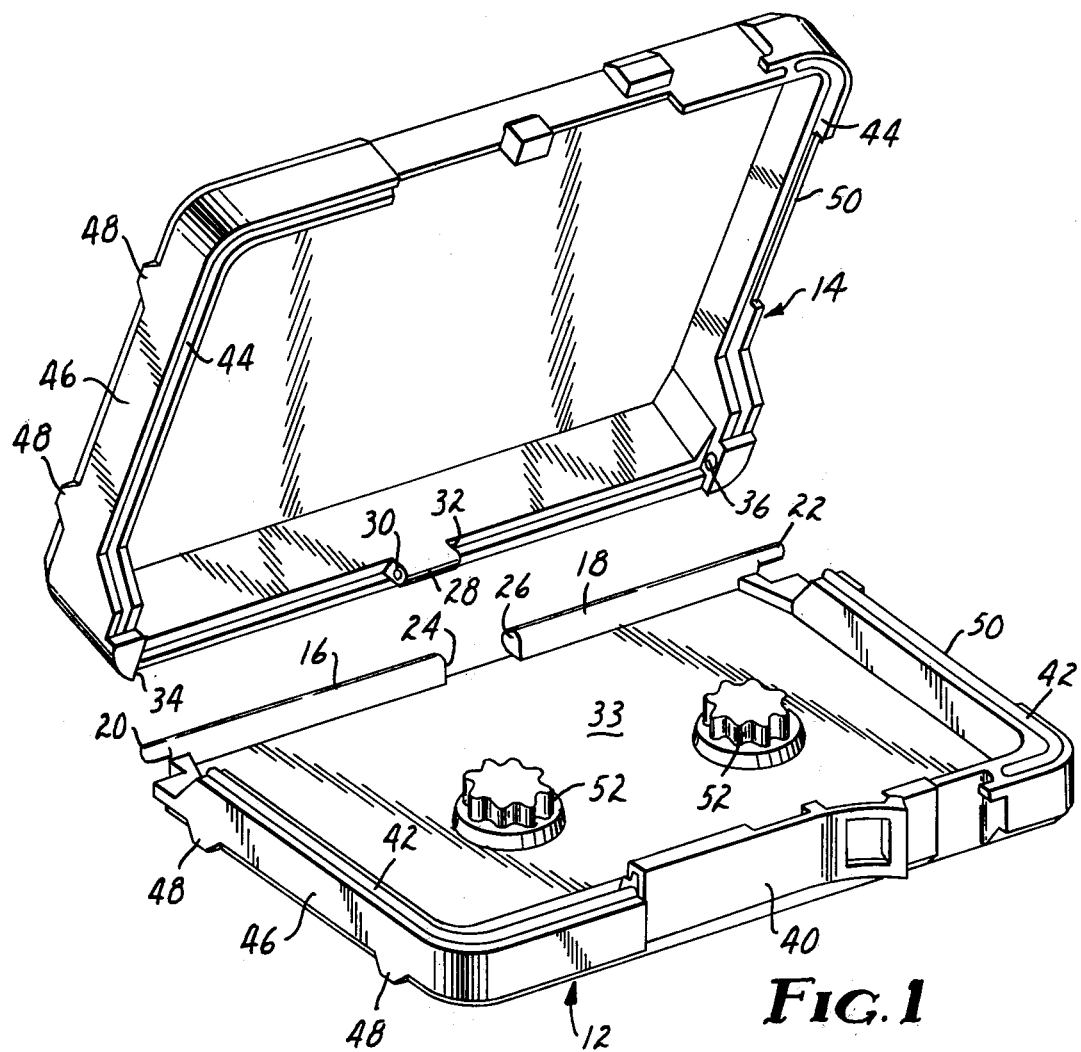

United States Patent [19]

Weavers et al.

[11] 4,211,337

[45] Jul. 8, 1980

[54] MULTIPLE-POINT HINGE FOR DOUBLE-WALL PLASTIC BOX

[75] Inventors: Mark W. Weavers, Little Canada; Anthony W. Konkler, Lakeland, both of Minn.

[73] Assignee: Minnesota Mining and Manufacturing Company, St. Paul, Minn.

[21] Appl. No.: 47,346

[22] Filed: Jun. 8, 1979

[51] Int. Cl.² ............... B65D 43/14; B65D 51/04
[52] U.S. Cl. .................. 220/341; 220/337; 206/387; 220/306; 220/469
[58] Field of Search ............ 220/337, 338, 341, 306, 220/349, 469, 345, 342, 343, 87 R, DIG. 26; 150/46

[56] References Cited

U.S. PATENT DOCUMENTS

| | | | |
|---|---|---|---|
| 4,005,800 | 2/1977 | Schurmann | 220/337 |
| 4,029,234 | 6/1977 | Johnson, Jr. et al. | 220/337 |
| 4,078,657 | 3/1978 | Schurman | 206/387 |
| 4,153,178 | 5/1979 | Weavers | 220/306 |

Primary Examiner—George T. Hall

[57] ABSTRACT

Hinge for two-part, double-wall plastic box. A spine-like projection extending along the rear of the base of the box terminates in hinge pins which fit into holes in the cover as in the prior art. In the novel box, the spine-like projection consists of two spaced spines, and another spine-like projection at the rear of the cover fits into the spacing between those spines to provide two additional hinge points.

4 Claims, 2 Drawing Figures

U.S. Patent    Jul. 8, 1980    4,211,337

MULTIPLE-POINT HINGE FOR DOUBLE-WALL PLASTIC BOX

FIELD OF THE INVENTION

The invention concerns a novel hinge for a blow-molded plastic box of double-wall construction.

BACKGROUND TO THE INVENTION

Blow-molded plastic boxes of double-wall construction are widely used where economy, durability and light weight are desired. The light weight reduces shipping costs, and the double-wall construction provides cushioning against shocks. One such box for tape cassettes is shown in U.S. Pat. No. 4,078,657. The detailed construction of its hinge is not illustrated, but a box essentially as illustrated in the patent has been on the market for several years. Extending along the rear of the base of the box is a hollow, upstanding spine which terminates in a pair of hinge pins that fit into holes drilled into the cover. In commercial production, the box is assembled soon after its parts are molded and while they are still warm and supple. The cover is placed in a fixture which spreads the holes apart slightly, and the assembler grasps the base and forces it into the fixture which bends the base of the box at the spine in order to bring the hinge pins closer together. As the hinge pins move into alignment with the holes, the bending force is released and the hinge pins snap into place. The hinge of the box which has been on the market has a lateral looseness which may not have been objectionable.

A similar hinge is used on another blow-molded, double-wall plastic box and shown in greater detail in U.S. Pat. No. 4,005,800.

THE PRESENT INVENTION

The present invention concerns a blow-molded, double-wall plastic box which has certain similarities to the hinged box of U.S. Pat. No. 4,078,657, but can be easily assembled without any fixture and more quickly. As in the patented box, one part of the box of the present invention has upstanding spine means extending along its rear edge and terminating in a pair of hinge pins, each fitting into a hole in the other part of the box. The novel hinge differs from that of the patented box in that its spine means comprises two separate spines, and the spine-carrying part of the box is of substantially normal double-wall thickness at the spacing between the spines. A projection from said other part of the box fits into the spacing between the two spines, and the adjacent ends of the projection and spines have mating convex and concave surfaces which provide additional hinge points. These hinge points provide a lateral stability which essentially eliminates any looseness in the hinge and thus affords improved quality.

The continuous upstanding spine means of the hinge of the patented box inhibits flexing and thus requires the use of a fixture for convenient assembly, whereas the substantially double-wall thickness at the spacing between the spines of the novel box permits easy flexing for assembly without any fixture, especially when the parts are still warm from the heat of molding. Both the projection and the spines should be of double-wall construction so as to have sufficient resilience to permit them to be moved into the mating position at which they preferably have an interference fit.

THE DRAWING

Figure 2:
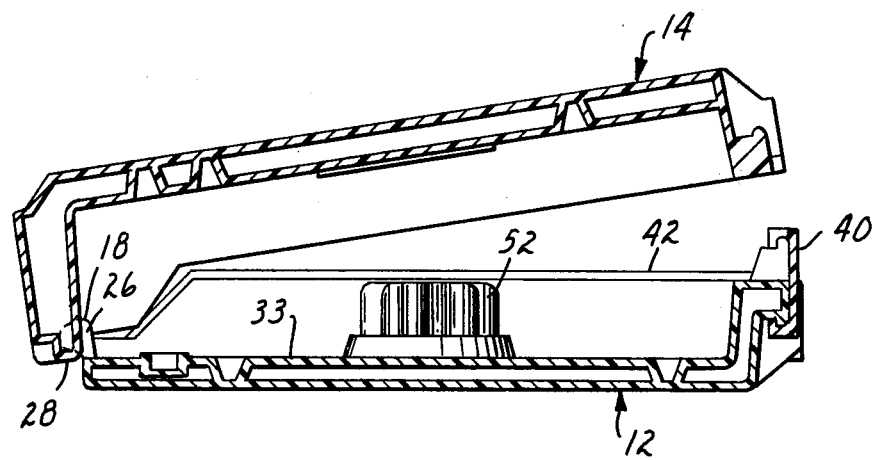

A hinged box embodying the invention is schematically illustrated in the drawing wherein:

FIG. 1 is an isometric view of the box, disassembled and omitting certain details of the construction of the double wall; and FIG. 2 is a central section through the assembled box, partially opened.

The box shown in the drawing comprises a base or container part 12 and a cover part 14. Two spaced, hollow, upstanding spines 16 and 18 extend along the rear of the base 12 and terminate at opposite ends in hinge pins 20 and 22, respectively. The adjacent ends of the spines 16 and 18 have convex surfaces 24 and 26. A hollow projection 28 from the rear of the cover 14 fits into the spacing between the spines 16 and 18 when the box is assembled and has concave surfaces 30 and 32 which mate with the convex surfaces 24 and 26, respectively, when the box is assembled. The thickness of the base 12 between the spines 16 and 18 is the same as that of its broad wall 33.

Preferably each of the convex surfaces 24 and 26 and the concave surfaces 30 and 32 is approximately spherical. The spacing between the convex surfaces 24 and 26 is slightly smaller than the distance between the concave surfaces 30 and 32 to provide an interference fit. The radii of the convex surfaces 24 and 26 are somewhat smaller than the radii of the concave surfaces 30 and 32 to insure good alignment. The mating of these surfaces gives a lateral stability and helps to rigidify the base 12 against any forces tending to flex the base in the area between the spines 16 and 18.

The cover 14 has a pair of holes 34 and 36 which serve as journals for the hinge pins 20 and 22, respectively. As in the patented boxes discussed above, these are conveniently formed by drilling through the first of the double walls of the cover 14 to reach the space between the walls which is of adequate depth to accept the hinge pins.

For convenience of molding the base 12, only the rearward portions of the convex surfaces 24 and 26 of the spines 16 and 18 are spherical. Their forward portions (closest to the interior of the box) are cut back to a minor extent (too minor to be shown in the drawing) to enhance the strength of the molding tool at its parting line.

The novel box is equipped with a latch 40 of the type disclosed in U.S. Pat. No. 4,153,178, and its base 12 is formed with ribs 42 as in U.S. Pat. No. 4,153,178 which fit into grooves 44 of the cover 14. One edge 46 of each of the base 12 and cover 14 is formed with abutments 48 which serve as legs to enable the box to stand on edge. The opposite edges of both the base 12 and cover 14 are recessed at 50 outside of the rib 42 and groove 44 so that one's finger can easily lift the cover from the base. The base has a pair of hubs 52 for holding the reels of a videocassette.

A preferred plastic for the novel box is high-density polyethylene which is commonly used for blow-molding, is of low cost and has good toughness, resistance to degradation and shape retention while having adequate flexibility for easy assembly of the box.

We claim:

1. A two-part, double-wall plastic box having a hinge comprising upstanding spine means extending along the rear of one part of the box and terminating in a pair of hinge pins, each fitting into a hole in the other part of the box, characterized by a feature that:

the spine means comprises at least two spaced spines, the spine-carrying part of the box is of substantially normal double-wall thickness at the spacing between the spines, a projection from said other part fits into the spacing between said spines, and the adjacent ends of the projection and spines have mating convex and concave surfaces which provide additional hinge points and lateral stability.

2. A plastic box as defined in claim 1 wherein there is an interference fit between the mating surfaces of the projection and spines.

3. A plastic box as defined in claims 1 or 2 wherein each of said convex and concave surfaces is approximately spherical.

4. A plastic box as defined in claim 3 wherein the convex surfaces are of smaller radii that the concave surfaces.

* * * * *